United States Patent [19]

Soni et al.

[11] Patent Number: 5,209,862

[45] Date of Patent: * May 11, 1993

[54] VI IMPROVER AND COMPOSITION CONTAINING SAME

[75] Inventors: Vivek K. Soni, Peabody, Mass.; Dale L. Handlin, Jr.; Carl L. Willis, both of Houston, Tex.

[73] Assignee: Shell Oil Company, Houston, Tex.

[*] Notice: The portion of the term of this patent subsequent to Mar. 26, 2008 has been disclaimed.

[21] Appl. No.: 650,376

[22] Filed: Jan. 30, 1991

[51] Int. Cl.$^5$ .......................................... C10M 143/12
[52] U.S. Cl. .................................... 252/56 R; 252/39; 252/41; 252/51.5 A
[58] Field of Search .................. 252/51.5 A, 56 R, 57, 252/39, 41

[56] References Cited

U.S. PATENT DOCUMENTS

| H724 | 1/1990 | Gergen et al. | 525/92 |
|---|---|---|---|
| H790 | 6/1990 | Gergen et al. | 525/314 |
| H815 | 9/1990 | Willis et al. | 252/49.6 |
| H826 | 10/1990 | Willis et al. | 252/51.5 A |
| Re. 27,145 | 6/1971 | Jones | 260/880 |
| 3,554,911 | 1/1971 | Schiff et al. | 252/59 |
| 3,668,125 | 6/1972 | Anderson | 252/59 |
| 3,772,196 | 11/1973 | St. Clair et al. | 252/32.7 E |
| 3,775,329 | 11/1973 | Eckert | 252/59 |
| 3,835,053 | 9/1974 | Meier et al. | 252/59 |
| 3,954,915 | 5/1976 | Schwab et al. | 252/56 R |
| 4,077,893 | 3/1978 | Kiovsky | 252/56 R |
| 4,116,917 | 9/1978 | Eckert | 260/33.6 AQ |
| 4,141,847 | 2/1979 | Kiovsky | 252/51.5 A |
| 4,145,298 | 3/1979 | Trepka | 252/51.5 A |
| 4,156,673 | 5/1979 | Eckert | 260/33.6 AQ |
| 4,427,834 | 1/1984 | Martin | 525/280 |
| 4,693,838 | 9/1987 | Varma et al. | 252/51.5 R |
| 4,780,228 | 10/1988 | Gardiner et al. | 252/51 |
| 4,849,481 | 7/1989 | Rhodes et al. | 525/314 |
| 4,898,914 | 2/1990 | Gergen et al. | 525/314 |
| 4,994,508 | 2/1991 | Shiraki et al. | 525/66 |
| 5,002,997 | 3/1991 | Gelles et al. | 524/505 |

FOREIGN PATENT DOCUMENTS 2139514  8/1971  Fed. Rep. of Germany .

Primary Examiner—Prince Willis, Jr.
Assistant Examiner—Alan D. Diamond
Attorney, Agent, or Firm—James O. Okorafor

[57] ABSTRACT

An improved viscosity index improver and an oil composition containing such a viscosity index improver are disclosed. The viscosity index improver is a carboxyl functionalized block copolymer which comprises of at least one monoalkenyl aromatic hydrocarbon polymer block and at least one conjugated diolefin polymer block. The oil can be selected from the group consisting of crude oils, mineral and synthetic lubricating oils, fuel oils, diesel oils, hydraulic oils, automatic transmission oils, and mixtures thereof.

17 Claims, No Drawings

VI IMPROVER AND COMPOSITION CONTAINING SAME

FIELD OF THE INVENTION

This invention relates to a VI improver and to an oil composition containing such a VI improver. More particularly, this invention relates to a process wherein a functionalized block copolymer is used as a VI improver and to an oil composition containing such a VI improver.

BACKGROUND

As is well known, the viscosity of lubricating oils varies with temperature, and since lubricating oils generally incur a relatively broad temperature range during use, it is important that the oil not be too viscous (thick) at low temperatures nor too fluid (thin) at high temperatures. In this regard, variation in the viscosity-temperature relationship of an oil is indicated by the so-called viscosity index (VI). The higher the viscosity index, the less the change in viscosity with temperature. In general, the viscosity index is a function of the oil viscosity at a given lower temperature and a given higher temperature. In the United States, the given lower temperature and the given higher temperature for cars have varied over the years but are fixed at any given time in an ASTM test procedure (ASTM D 2270). Currently the lower temperature specified in the test is 40° C. and the higher temperature in the test is 100° C.

Heretofore, several methods have been proposed for improving the rheological properties of lubricating oil compositions. Frequently these methods involve the use of one or more polymeric additives. Methods of this type wherein the polymeric additive is a linear or branched chain polymer, are taught, for example in U.S. Pat. Nos. 3,554,911; 3,668,125; 3,772,196; 3,775,329 and 3,835,053. The polymeric additives taught in this series of U.S. patents are, generally, hydrogenated, linear or substantially linear polymers of one or more conjugated dienes which may, optionally, also contain monomeric units of one or more monoalkenyl aromatic hydrocarbons. Polymers of the type disclosed in this series of patents are typically prepared via the anionic solution polymerization of the monomers followed by hydrogenation. A selectively hydrogenated, linear block copolymer comprising a single styrene polymer block and a single selectively hydrogenated isoprene polymer block which block copolymer is within the scope of U.S. Pat. No. 3,772,196 is available commercially and is commonly used a VI improver.

Methods of this type wherein the polymeric additive is a star-shaped polymer are taught, for example, in U.S. Pat. Nos. 4,077,893; 4,116,917; 4,141,847; 4,156,673; and 4,427,834. This polymeric additives taught in this series of patents are, generally, star-shaped (radial) polymers wherein all, or at least most, of the polymer arms will be either homopolymers or copolymers of conjugated dienes or copolymers of one or more conjugated dienes and one or more monoalkenyl aromatic hydrocarbons. In certain of these polymeric additives, however, one or more arms will either be modified or different. Polymers wherein all of the arms are either hydrogenated homopolymers or copolymers of one or more conjugated diolefins and one or more monoalkenyl aromatic hydrocarbons or a mixture of such arms are described in U.S. Pat. Nos. 4,116,917 and 4,156,673. Star polymers of the type disclosed in U.S. Pat. Nos. 4,116,197 and 4,156,673 which are modified to incorporate functional groups imparting dispersant characteristics are taught in U.S. Pat. Nos. 4,077,893, 4,141,847 and 4,427,834. The polymeric additives disclosed in U.S. Pat. No. 4,077,893 are hydrogenated star-shaped polymers which are reacted first with an unsaturated carboxylic acid or derivative thereof and then with an alkane polyol. The polymeric additives disclosed in U.S. Pat. No. 4,141,847 are hydrogenated star-shaped polymers which are reacted first with an unsaturated carboxylic acid or derivative thereof and then with an amine. The polymeric additive taught in U.S. Pat. No. 4,427,834 is one wherein one or more of the arms of a star-shaped polymer such as those taught in U.S. Pat. Nos. 4,116,917 and 4,156,673 is, effectively, replaced with an arm prepared by polymerizing a nitrogen containing monomer. Star-shaped polymers wherein all of the arms are homopolymers of isoprene which star-shaped polymers are within the scope of the teaching of both U.S. Pat. Nos. 4,116,917 and 4,156,673 are commercially available and commonly used as VI improvers.

As is well known in the prior art, thickening efficiency of a polymeric additive has, heretofore, generally been the principal, and sometimes the sole consideration in its selection for use as a VI improver. Particularly, polymeric additives which significantly increase the high temperature kinematic viscosity without significantly increasing the low temperature kinematic viscosity are sought. Emphasis was, then, given to obtaining a good VI improver based upon previously specified temperatures and little consideration has been given to the viscosity at even higher temperatures such as 150° C. Now, however, with the advent of the smaller more compact engines which have higher operating temperatures, it is necessary to consider viscosities at these higher temperatures in selecting VI improvers.

Recently, it has been discovered that certain hydrogenated, asymmetrical radial polymers yield particularly effective VI improvers and offer improved high temperature kinematic viscosities. This discovery is described, inter alia, in U.S. Pat. No. 4,849,481. These hydrogenated asymmetric radial polymers comprise a plurality of arms, a portion of which arms are polymers of one or more hydrogenated conjugated diolefins and another portion of which arms are block copolymers comprising a polymeric block containing predominantly one or more monoalkenyl aromatic hydrocarbon monomer units and a polymeric block containing predominantly one or more hydrogenated conjugated diolefin monomer units. These asymmetric radial polymers are prepared by first coupling a suitable blend of living polymers in the same manner used, generally, to prepare star-shaped polymers and then selectively hydrogenating the conjugated diolefin portions of the radial polymers. As indicated in this patent application, these polymers do offer enhanced kinematic viscosities at higher temperatures such as 150° C. and it is anticipated that their use in engine oil compositions for the smaller engines would offer significantly improved performance. The need remains, however, for even further improvement in the high temperature kinematic viscosities and for perhaps even an easier method for obtaining such results.

SUMMARY OF THE INVENTION

It has now been discovered that the aforementioned improved viscosity index improver of the prior art can be even further improved with the VI improver of this invention and with an oil composition containing the same. It is, then, an object of this invention to provide an improved VI improver and an oil composition containing the same. It is another object of this invention to provide a VI improver having good high temperature kinematic viscosities and an oil composition comprising the same. It is still another object of this invention to provide an improved process for preparing such a VI improver.

In accordance with the present invention, the foregoing and other objects and advantages are accomplished with a linear or branched chain selectively hydrogenated block copolymer modified by incorporating a carboxyl functionality therein and with an oil composition comprising such a viscosity improver. [The term carboxyl functionality as used herein includes both its acidic and non-acidic forms.] The selectively hydrogenated block copolymer comprises at least one polymer block containing predominantly monalkenyl aromatic hydrocarbon monomer units and at least one polymer block containing predominantly conjugated diolefin monomer units. As used herein, the term predominantly shall mean that the specified monomer or monomers comprises at least 85 weight percent of the polymer block. The selectively hydrogenated polymer is modified by incorporating the carboxyl functionality substantially into the polymer block or blocks comprising predominantly monoalkenyl aromatic hydrocarbon monomer units.

DETAILED DESCRIPTION OF THE INVENTION

As previously indicated, the present invention relates to an improved linear or branch chained polymeric VI improver and to a lubricating oil composition comprising such a VI improver. The composition of matter actually used as the VI improver is known; the present invention, therefore, constitutes a new use for a known composition of matter. The known composition of matter, then, is a carboxyl functionalized block copolymer, said block copolymer comprising at least one polymeric block containing predominantly monoalkenyl aromatic hydrocarbon monomer units and at least one polymeric block containing predominantly conjugated diolefin monomer units. The block copolymer is selectively hydrogenated such that at least 80% of the ethylenic unsaturation initially contained in the polymer is converted or saturated and the block copolymer is functionalized by incorporating carboxyl functionality substantially into the polymeric block or blocks containing predominantly monoalkenyl aromatic hydrocarbon monomer units.

The block copolymers useful in the present invention are within the scope of those described in U.S. patent application Ser. No. 766,217, filed Aug. 16, 1985, and U.S. Pat. No. 4,898,914. The weight average molecular weight of the monoalkenyl aromatic monomer unit polymer blocks useful in this invention will be between 500 and 50,000 while the weight average molecular weight of the conjugated diolefin polymer blocks useful in this invention will be within the range from about 10,000 to about 150,000. As indicated in the copending application, the carboxyl functionality in the polymers useful in the present invention will be incorporated by reacting $CO_2$ with a polymer containing metal atoms in the monoalkenyl aromatic hydrocarbon polymer blocks. The polymers useful in the present invention will have 1,2-microstructures prior to hydrogenation within the range of from about 7 to about 100 percent.

As indicated in copending application Ser. No. 766,217 and U.S. Pat. No. 4,898,914, the polymer useful in the present invention may be prepared by first metalizing a previously prepared polymer by reacting the same with a suitable metalization agent such as alkyl lithium $R(Li)_x$. Generally, the metalization will be accomplished in the presence of a suitable polar metalization promoter such as a tertiary amine, a bridgehead monoamine, an ether or a metal alkyloxide. After the polymer is metalated, the same will then be reacted with $CO_2$ to incorporate an acid salt of the metal contained in the metalization compound and then neutralized to form carboxylic acid radical.

When the acidic form of the carboxyl functionality is to be used, the functional group will be predominantly in the acid form. Alternatively, when the non-acid form of the carboxyl functionality is to be used, the functional group will be predominantly in the non-acid form. The term non-acid as used herein, shall mean metal-acid salts, esters, amides, and like functional groups, having a pH equal to or greater than 7.

Copolymers useful in the present invention will be functionalized to the extent of from about 0.1 to about 40 mole percent carboxyl functionality based on the total aromatic monomer in the copolymer.

In general, the selectively hydrogenated and functionalized block copolymer useful in this invention may be used in a broad range of hydrocarbons to improve the VI thereof. The selectively hydrogenated, functionalized polymer of the present invention is particularly useful when added to a variety of oils including crude oils, mineral and synthetic lubricating oils, fuel oils, diesel oils, hydraulic oils, automatic transmission oils and the like to produce oil compositions having improved viscosity index characteristics. The oils may be paraffinic, naphthenic and aromatic. The polymer useful in this invention is particularly useful when used in hydrocarbon liquids, particularly oils, with nonsaturated (aromatic) and non-polar groups as determined by clay gel analysis within the range of from about 0 to about 35 weight percent. This, then, covers a range of base oil stocks from synthetic oils such as polyalpha olefin oils to natural NVI oils. In general, the polymer useful in this invention will be effective to improve viscosity index characteristics at concentrations within the range of from about 0.1 to about 15 weight percent although concentrations within the range of from about 0.1 to about 2 percent are most effective. The higher concentrations, then, would normally be diluted down prior to actual use.

In general, oils containing the VI improver of this invention may optionally contain other additives such as dispersants, detergents, antioxidants, extreme pressure additives and pour point depressants. These additives are not, however, necessary to obtaining the improved viscosity index characteristics offered by the viscosity index improver of this invention.

PREFERRED EMBODIMENT OF THE INVENTION

In a preferred embodiment of the present invention, a diblock copolymer comprising a single polymeric block containing predominantly monoalkenyl aromatic hydrocarbon monomer units and a single polymeric block containing predominantly conjugated diolefin monomer units will be functionalized so as to contain a carboxyl functionality in the monoalkenyl aromatic hydrocarbon polymer block and used as a VI improver. The carboxyl functionality will, preferably be in the all acid or non-acid form. The weight average molecular weight of the monoalkenyl aromatic hydrocarbon polymer block in the diblock copolymer will range from about 10,000 to about 150,000. The molecular weight of each block will be controlled such that the weight ratio of monoalkenyl aromatic hydrocarbon monomer units to conjugated diolefin monomer units will be within the range of from about 0.05:1 to about 1:1. In the preferred embodiment, the viscosity index improver may be used in a fully formulated SAE 10W40 multigrade overbased engine oil formulation. The SAE 10W40 overbased oil formulation may contain from about 8 to about 10 weight percent of a standard SG/CD additive package and will contain from about 0.1 to about 2.0 weight percent of the modified block copolymer. The modified diblock copolymer will contain from about 0.1 to about 40 mole percent (based on total aromatic monomer units) of carboxyl functional groups. The modified diblock copolymer will be hydrogenated such that at least 95% of the initial ethylenic unsaturation is converted (saturated). In a most preferred embodiment of the present invention, the monoalkenyl aromatic monomer will be styrene and the conjugated diolefin will be isoprene.

Having thus broadly described the present invention and a preferred embodiment thereof, it is believed that the invention will become even more apparent by reference to the following examples. It will be appreciated, however, that the examples are presented solely for purposes of illustration and should not be construed as limiting the invention.

EXAMPLE 1

In this example, a diblock copolymer containing a polystyrene block having a weight average molecular weight of 37,000 and a polyisoprene block having a weight average molecular weight of 65,000 which was modified to contain 1.12 weight percent carboxyl functionality (in the all acid form) based on aromatic monomer via the lithium metalation technique taught in copending application Ser. No. 766,217 and U.S. Pat. No. 4,898,914 was used in the formulation of an SAE 10W40 multigrade lubricating oil composition. A modified block copolymer having varying polymer concentrations was used. The base oil used in the oil composition contained a ratio of 75 parts of HVI 100N oil to 25 parts HVI 250N oil and the oil composition contained 7.75 weight percent of a standard SF/CC commercially available additive package and 0.5 weight percent Acryloid 154-70. After preparation, the SAE 10W40 oil composition was tested to determine its viscosity index; cold cranking simulator (CCS) viscosity at −20° C.; engine oil pumpability at −25° C. using the TP1 mini-rotary viscometer (MRV) method according to ASTM D3829; high temperature, high shear rate (HTHSR) viscosity at 150° C. and 1×10$^6$ seconds$^{-1}$ using the tapered bearing simulator (TBS), and its mechanical shear stability using the so-called diesel injector rig test according to ASTM D3945. The results obtained are shown in Table I under the respective headings VI; CCS−20° C. CP; TP1/MRV−25° C. CP; TBS 150° C. CP; and DIN % VIS loss. For comparative purposes the same data was obtained on an SAE 10W40 oil composition containing an unfunctionalized diblock copolymer having the same weight average molecular weights. The unfuctionalized diblock copolymer was used in the oil composition at a similar concentration as the functionalized diblock copolymer. These results too are summarized in the Table I. For convenience, the composition containing the functionalized polymer is identified as composition #1 in Table I while the composition containing the unfunctionalized polymer is identified as composition #2.

TABLE I

| COMP. NO. | POLYMER Wt % | VI | CCS −20° C. CP | TP1/MRV −25° C., CP | TBS 150° C. CP | DIN % vis loss |
|---|---|---|---|---|---|---|
| 1 | 1.27 | 156 | 3190 | 14,963 | 3.16 | 11.71 |
| 2 | 1.23 | 156 | 3214 | 16,551 | 3.38 | 6.39 |

As is apparent from the data summarized in the Table I, the overall properties of the oil composition prepared with the modified block copolymer are generally comparable to those obtained with the unmodified block copolymer.

EXAMPLE 2

In this example, the run of Example 1 was repeated except that a diblock copolymer having a styrene polymer block with a weight average molecular weight of 40,000 and isoprene polymer block with a weight average molecular weight of 107,000 were substituted for the diblock copolymer used in Example 1. Also, the functionality on the polymer was reduced from 1.12 wt % to 0.5 wt % in this example. After the SAE 10W40 oil was prepared, the same properties were then determined using the same methods as in Example 1. The results obtained are summarized in Table II using the same sub-headings and testing procedures of Table I. For convenience, the composition containing the functionalized polymer is designated in Table II as Composition No. 3 while the composition containing the unfunctionalized polymer is designated as Composition No. 4.

TABLE II

| COMP. NO. | POLYMER Wt % | VI | CCS −20° C. CP | TP1/MRV −25° C., CP | TBS 150° C. CP | DIN % vis loss |
|---|---|---|---|---|---|---|
| 3 | 0.76 | 157 | 3214 | 16,279 | 3.04 | 38.10 |
| 4 | 0.82 | 148 | 3099 | 16,597 | 3.16 | 34.30 |

The results shown in Table II is consistent with those of Table I, i.e. the measured properties of both the modified and unmodified block copolymer are generally comparable.

EXAMPLE 3

In this Example, two salts and an ester of a diblock copolymer containing a polystyrene block having a weight average molecular weight of 37,000 and an isoprene polymer block having a weight average molecular weight of 170,000 were prepared and tested for kinematic viscosity at 40° C., 100° C. and 150° C. The salt functionalities incorporated were the lithium and sodium salts and the ester functionality was the methyl ester. These functionalities were substantially incorporated into the styrene polymer block using the method taught in copending applications Ser. Nos. 766,217 and 194,670. The lithium salt was formed by direct metallation of the diblock copolymer while the sodium salt and the ester were formed by converting the metallated product to the acid version. The acid version was then converted to the corresponding sodium salt by reacting with sodium hydroxide and to the corresponding methyl ester by first neutralizing the acid functionality with tetrabutyl ammonium hydroxide and then reacting with methyl iodide. For comparative purposes, the kinematic viscosities of an unfunctionalized copolymer was determined at the same temperatures. The kinematic viscosities in all cases were determined at a polymer concentration of 1.73 wt % in an HVI 100N oil. The concentration of Na salt was 1.3 wt % and the ester concentration was 1.12 wt %. The results obtained with the sodium salt and ester functionalized copolymers are summarized in Table III.

TABLE III

| Functionality | Kinematic Viscosity, cP | | |
|---|---|---|---|
| | 40° C. | 100° C. | 150° C. |
| Na Salt | 101.0 | 17.0 | 7.2 |
| Methylester | 123.7 | 18.6 | 7.2 |
| None | 111.7 | 18.2 | 4.9 |

As is apparent from the data in preceding Table III, the kinematic viscosity at 150° C. is significantly improved from 4.9 to 7.2 with the functionalized copolymers of this invention.

EXAMPLE 4

In this example, the reduced viscosity of a modified diblock copolymer was determined at 2 different functionalization levels at 150° C. The diblock copolymer actually used in this example had a polystyrene block having a weight average molecular weight of 37,000 and a conjugated diolefin polymer block having a weight average molecular weight of 65,000 and the polymer was functionalized using the lithium metalization technique taught in copending application Ser. No. 766,217 and U.S. Pat. No. 4,898,914. As is well known, the reduced viscosity is designed to permit a comparison of properties, such as thickening efficiency of a viscosity index improver independent of polymer concentration and solvent viscosity effects. In this example, the reduced viscosity was determined at a carboxylic acid functionality level (all acid form) of 0.22 and 1.3 wt % based on total polymer and at a polymer concentration in oil of 1.73 wt % based on total oil composition. The oil used in preparing each of the compositions was an HVI 100N lubricating oil and the compositions was prepared by dissolving the polymer in oil on each occasion. The results obtained are summarized in Table IV which shows the oil composition by designating the amount of functional group on the polymer and the reduced viscosity under a column headed Red. Vis. For purposes of comparison, the results obtained on a composition prepared with an unfunctionalized polymer having the same molecular weight and contained in the composition at the same weight percent was obtained and this result is also reported in Table IV.

TABLE IV

| Carboxyl Functional Group wt % | Red. Vis. |
|---|---|
| 0 | 4.05 |
| 0.22 | 4.81 |
| 1.3 | 6.60 |

As is apparent from the data summarized in Table IV, the reduced viscosity at 150° C. is significantly improved with the carboxyl functionalized polymer of this invention and the improvement increases with increased carboxyl functionality in the polymer.

EXAMPLE 5

In this example, the runs completed in Example 4 were repeated except that a polymer having a single styrene polymer block having a weight average molecular weight of 40,000 and a single isoprene polymer block having a weight average molecular weight of 107,000 was substituted for the polymer used in Example 8 and the tests were conducted at different carboxyl functional group levels of 0.5 and 0.8 wt %. After the oil compositions were prepared, each was tested for the same property as was evaluated in Example 4 and the results obtained are summarized in Table V. Again, for comparison purposes, the same property was also determined for a composition containing the unfunctionalized polymer and the result is also reported in Table V.

TABLE V

| Functional Group wt % | Red. Vis. |
|---|---|
| 0 | 5.33 |
| 0.5 | 16.35 |
| 0.8 | 21.66 |

As is apparent from the data summarized in Table V, the reduced viscosity at 150° C. is significantly improved by the incorporation of a carboxyl functionality into the aromatic hydrocarbon monomer unit polymer blocks. It is also apparent that increasing the amounts of carboxyl functionality significantly further improves the reduced viscosity at 150° C. A comparison of the result summarized in Tables IV and V illustrates that the reduced viscosity at 150° C. is much more improved when a modified block copolymer having increased molecular weight is used.

EXAMPLE 6

In this Example, the reduced viscosities of the three polymers used in Example 3 were determined at 150° C. using the copolymers in HVI 100N oil at the same concentration and with the same level of functionality. The results obtained from this Example and the results obtained with an unfunctionalized copolymer are summarized in Table VI.

TABLE VI

| Functionality | Reduced Viscosity |
|---|---|
| Li salt | — |
| Na salt | — |
| methyl ester | 1.05 |
| none | 0.55 |

As is apparent from the data summarized in Table VI, the reduced viscosity is significantly improved with the methylester functionalized copolymer. Although inadvertently unrecorded, a similarly significant improvement was obtained with the lithium and sodium salts carboxyl functionalized copolymers.

EXAMPLE 7

In this Example, six hydrogenated isoprene-styrene block copolymers were carboxylated using the lithium metalation technique taught in copending application Ser. No. 766,217 and U.S. Pat. No. 4,898,914. The block copolymers had varying molecular weights of hydrogenated isoprene blocks, and of styrene blocks. Varying amounts of carboxyl functionality (in the all acid forms) in the styrene blocks were formulated into SAE 10W40 multigrade oil compositions in the same manner as was used in Example 1. In each composition the polymer was used at the concentration required to produce an SAE 10W40 oil. The base oil comprised 75 parts by weight of HVI 100N oil and 25 parts by weight HVI 250N oil and the oil composition contained 7.75 wt %, based on oil, of a standard SF/CC commercially available additive package and 0.5 wt %, based on oil, of Acryloid 154-70. After preparation, the SAE 10W40 oil compositions were tested to determine the cold cranking simulator (CCS) viscosity at $-25°$ C.; the engine oil pumpability at $-25°$ C. using the TP1 mini-rotary viscometer (MRV) method according to ASTM D4684 and the tapered bearing simulator (TBS) viscosity at $1 \times 10^{-6} s^{-1}$ using the procedure described in ASTM D4683. The results obtained are summarized in the Table VII under the headings titled CCS $-25°$ C., cP; TP-1-MRV, cP; and TBS, cP. Table VII also show the amount of polymer required to produce the SAE10W40 oil composition in wt % polymer under the heading, polymer wt %; the weight average molecular weight of the hydrogenated isoprene (EP) and the styrene (S) polymer blocks $\times 10^{-3}$ under the heading MW$\times 10^{-3}$, and the amount of carboxyl functionality in mol % based on the mols of styrene in the polymer, under the heading carboxyl functional mol %.

TABLE VII

| MW $\times 10^{-3}$ | | Polymer | Carboxyl Functional, | CCS $-25°$ C., | TP1-MRV, | TBS |
|---|---|---|---|---|---|---|
| EP | S | wt % | mol % | cP | cP | cP |
| 61 | 37 | 1.08 | 0 | 3274 | 19,300 | 2.7 |
| 61 | 37 | 1.04 | 3.5 | 3322 | 16,416 | 2.7 |
| 66 | 17 | 1.48 | 0 | 3637 | 27,940 | 3.2 |
| 66 | 17 | 0.90 | 14.4 | 3284 | 14,458 | 2.7 |
| 69 | 21 | 1.36 | 0 | 3517 | 24,523 | 3.0 |
| 69 | 21 | 0.93 | 8.9 | 3284 | 15,869 | 2.7 |
| 94 | 10 | 1.15 | 0 | 3685 | 29,926 | 3.1 |
| 94 | 10 | 0.59 | 24.6 | 3188 | 13,810 | 2.5 |
| 106 | 25 | 0.89 | 0 | 3418 | 22,358 | 2.8 |
| 106 | 25 | 0.65 | 12.2 | 3212 | 14,646 | 2.5 |
| 135 | 37 | 0.56 | 0 | 3176 | 17,888 | 2.5 |
| 135 | 37 | 0.59 | 6.5 | 3077 | 15,530 | 2.4 |

EXAMPLE 8

In this Example, the compositions were prepared as in Example 7, with the exception that the block copolymers were unfunctionalized. After the SAE 10W40 oil compositions were prepared, the same properties thereof were determined in the same manner as was used in Example 7. The results obtained are summarized in Table VII.

As is apparent from the data summarized in Table VII, the CCS, TP1-MRV and TBS viscosity of the oil compositions containing the carboxyl functionalized block copolymer of this invention were, generally, less than those of the oil compositions containing the unfunctionalized polymer. Also, with one exception, the amount of polymer required to produce the SAE 10W40 oil was less with the functionalized block copolymer. This then can be interpreted to mean that functionalization generally improves thickening efficiency at the temperatures conventionally used in preparing multigrade oil compositions.

EXAMPLE 9

In this Example, the kinematic viscosities of the six block copolymers used in Example 7 and the six block copolymers used in Example 8 were determined in a base oil stock identical to that used in Examples 7 and 8. In each case, the polymer was used at 1.2 wt % based on the amount of oil. The kinematic viscosities were determined in cSt at 40° C., 100° C. and 150° C. The results obtained are summarized in Table VIII which also show the weight average molecular weights of the hydrogenated isoprene (EP) and styrene (S) polymer blocks $\times 10^{-3}$ under the heading, MW$\times 10^{-3}$, and the amounts of carboxyl functionality in the monoalkenyl aromatic polymer unit under the heading, carboxyl functional, mol. %.

TABLE VIII

| MW $\times 10^{-3}$ | | Carboxyl Functional | Kinematic viscosity, cSt | | |
|---|---|---|---|---|---|
| EP | S | Mol % | 40° C. | 100° C. | 150° C. |
| 61 | 37 | 0 | 53.8 | 9.8 | 3.6 |
| 61 | 37 | 3.5 | 51.7 | 9.8 | 4.2 |
| 66 | 17 | 0 | 70.6 | 7.2 | 3.3 |
| 66 | 17 | 14.4 | 68.4 | 12.0 | 4.9 |
| 69 | 21 | 0 | 65.4 | 7.1 | 3.2 |
| 69 | 21 | 8.9 | 64.5 | 11.4 | 4.7 |
| 94 | 10 | 0 | 46.9 | 8.5 | 4.0 |
| 94 | 10 | 24.6 | 117.9 | 17.7 | 5.8 |
| 106 | 25 | 0 | 150.8 | 10.5 | 4.1 |
| 106 | 25 | 12.2 | 150.5 | 23.9 | 9.0 |
| 135 | 37 | 0 | 190.9 | 30.2 | 4.5 |
| 135 | 37 | 6.5 | 190.8 | 32.3 | 10.5 |

As is apparent from the data summarized in Table VIII, the kinematic viscosity at 150° C. improved each time the block copolymer was functionalized with carboxyl functionality. Moreover, the improvement in kinematic viscosity at 150° C. became more profound with higher block copolymer molecular weights. As is also apparent from the data summarized in Table VIII, the kinematic viscosity at 100° C. was generally improved by carboxyl functionalization of the monoalkenyl aromatic polymer units.

While the present invention has been described and illustrated by reference to particular embodiments thereof, it will be appreciated by those of ordinary skill in the art that the same lends itself to variations not necessarily illustrated herein, but are within the scope and spirit of this invention.

That which is claimed is:

1. An oil composition comprising a selectively hydrogenated, block copolymer to which has been grafted carboxyl functional groups comprising at least one monoalkenyl aromatic hydrocarbon unit polymer block and at least one hydrogenated conjugated diolefin polymer block as a viscosity index improver, said block copolymer being functionalized in the monoalkenyl aromatic hydrocarbon polymer block.

2. A composition as in claim 1 wherein the monoalkenyl aromatic hydrocarbon polymer block has a weight average molecular weight within the range of from about 500 to about 50,000; and the conjugated diolefin polymer block has a weight average molecular weight within the range of from about 10,000 to about 150,000.

3. A composition as in claim 1 wherein said block copolymer contains from about 0.1 to about 40 weight percent based on monoalkenyl aromatic hydrocarbon monomer units weight of carboxyl functional groups.

4. A composition as in claim 1 wherein said carboxyl functionality is either acid or non-acidic.

5. A composition as in claim 1 wherein said carboxyl functionality is acidic.

6. A composition as in claim 1 wherein said carboxyl functionality is non-acidic.

7. A composition as in claim 6 wherein said non-acidic carboxyl functionality is selected from the group comprising metal-acid salts, esters, and amides.

8. A composition as in claim 7 wherein said metal acid salt is a salt of lithium or sodium.

9. A composition as in claim 7 wherein said ester is methylester.

10. A composition as in claim 1 wherein said oil is selected from the group consisting of crude oils, mineral and synthetic lubricating oils, fuel oils, diesel oils, hydraulic oils, automatic transmission oils and mixtures thereof.

11. A composition as in claim 10 wherein said oil is selected from the group consisting of paraffinic oils, naphthenic oils, aromatic oils and mixtures thereof.

12. A composition of claim 11 wherein the amount of unsaturated (aromatics) and polar compounds in said oil is within the range of from about 0 to about 35 wt %.

13. An oil composition as in claim 10 wherein the weight average molecular weight of the monoalkenyl aromatic hydrocarbon polymer block is within the range of from about 500 to about 59,000 and the weight average molecular weight of the conjugated diolefin polymer block is within the range of from about 10,000 to about 150,000.

14. An oil composition as in claim 10 wherein said polymer contains from about 0.1 to about 40 wt %, based on monoalkenyl aromatic hydrocarbon monomer units weight, of carboxyl functional groups.

15. An oil composition as in claim 14 wherein said monoalkenyl aromatic hydrocarbon is styrene and said conjugated diolefin is isoprene.

16. An oil composition as in claim 10 wherein said polymer is present at a concentration within the range from about 0.1 to about 15 wt %, based on oil.

17. An oil composition as in claim 16 wherein said polymer is present at a concentration within the range from about 0.1 to about 2 wt %, based on oil.

* * * * *